(12) United States Patent
Ho et al.

(10) Patent No.: US 12,707,361 B2
(45) Date of Patent: Aug. 11, 2026

(54) WIRELESS LOCAL AREA NETWORK MAKE-BEFORE-BREAK HANDOVER

(71) Applicant: QUALCOMM Incorporated, San Diego, CA (US)

(72) Inventors: Sai Yiu Duncan Ho, San Diego, CA (US); George Cherian, San Diego, CA (US); Alfred Asterjadhi, San Diego, CA (US); Abhishek Pramod Patil, San Diego, CA (US); Abdel Karim Ajami, Lakeside, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 17/954,321

(22) Filed: Sep. 27, 2022

(65) Prior Publication Data

US 2024/0107411 A1 Mar. 28, 2024

(51) Int. Cl.
*H04W 36/18* (2009.01)
*H04W 36/00* (2009.01)

(52) U.S. Cl.
CPC ..... *H04W 36/185* (2023.05); *H04W 36/0033* (2013.01)

(58) Field of Classification Search
CPC ............ H04W 76/15; H04W 36/0033; H04W 36/185
See application file for complete search history.

(56) References Cited

U.S. PATENT DOCUMENTS

2017/0353896 A1 12/2017 Nath et al.
2019/0306774 A1 10/2019 Cai et al.
2021/0014911 A1 1/2021 Patil et al.
2021/0092654 A1* 3/2021 Kadiri ..................... H04W 8/24
2021/0266931 A1 8/2021 Kwon et al.
2022/0132608 A1 4/2022 Chu et al.
2022/0279401 A1* 9/2022 Wallentin .............. H04W 76/30
2023/0254740 A1* 8/2023 Sedin .................... H04W 36/18 370/331
2024/0015826 A1* 1/2024 Smith ............... H04W 28/0236
2024/0064836 A1* 2/2024 Shafin ..................... H04W 8/24
2024/0114415 A1 4/2024 Ho et al.
2024/0147318 A1 5/2024 Khandavalli et al.
2024/0284301 A1 8/2024 Elsherif et al.
2024/0306062 A1 9/2024 Verma et al.
2026/0025657 A1 1/2026 Yuan

OTHER PUBLICATIONS

International Search Report and Written Opinion—PCT/US2023/074495—ISA/EPO—Jan. 16, 2024.

* cited by examiner

*Primary Examiner* — Allahyar Kasraian
(74) *Attorney, Agent, or Firm* — Patterson + Sheridan, L.L.P.

(57) ABSTRACT

Certain aspects of the present disclosure provide A method for wireless communication at a first wireless station, generally including communicating, via a first link, with a first access point (AP) affiliated with a multi-link device (MLD), enabling a second link with a second AP affiliated with the MLD, communicating, during a handover of the first wireless station from the first AP to the second AP, with the first AP via the first link and with the second AP via the second link, and disabling the first link with the first AP after completion of the handover.

12 Claims, 13 Drawing Sheets

Before Transition (AP1 has MLD context)

During Transition (AP1 optionally duplicates/forwards packets to AP2, both AP1 & AP2 send packets to STA)

After Transition

WIRELESS LOCAL AREA NETWORK MAKE-BEFORE-BREAK HANDOVER

BACKGROUND

Technical Field

Aspects of the present disclosure relate to wireless communications, and more particularly, to techniques for wireless local area network (WLAN) make-before-break handover.

Description of the Related Technology

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (such as tens of meters to a few hundred meters).

SUMMARY

One innovative aspect of the subject matter described in this disclosure provides a method for wireless communication at a first wireless station. The method includes communicating, via a first link, with a first access point (AP) affiliated with a multi-link device (MLD); enabling a second link with a second AP affiliated with the MLD; communicating, during a handover of the first wireless station from the first AP to the second AP, with the first AP via the first link and with the second AP via the second link; and disabling the first link with the first AP after completion of the handover.

Another innovative aspect of the subject matter described in this disclosure provides a method for wireless communication at a first AP. The method includes communicating, via a first link, with a wireless station during a handover of the wireless station from the first AP to a second AP, wherein the wireless station is associated with a MLD with which the first AP and second AP are both affiliated; outputting, for transmission to the second AP, context information for the MLD; and disabling the first link with the first wireless station after the handover.

Another innovative aspect of the subject matter described in this disclosure provides a method for wireless communication at a second AP. The method includes communicating, via a second link, with a wireless station during a handover of the wireless station from a first AP to the second AP, wherein the wireless station is associated with a MLD with which the first AP and second AP are both affiliated; obtaining, from the first AP, context information for the MLD; and outputting, for transmission to the first AP, signaling indicating a completion of the handover.

Other innovative aspects of the subject matter described in this disclosure provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration. Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF DRAWINGS

The appended figures depict certain features of the various aspects described herein and are not to be considered limiting of the scope of this disclosure.

DETAILED DESCRIPTION

Figure 1:
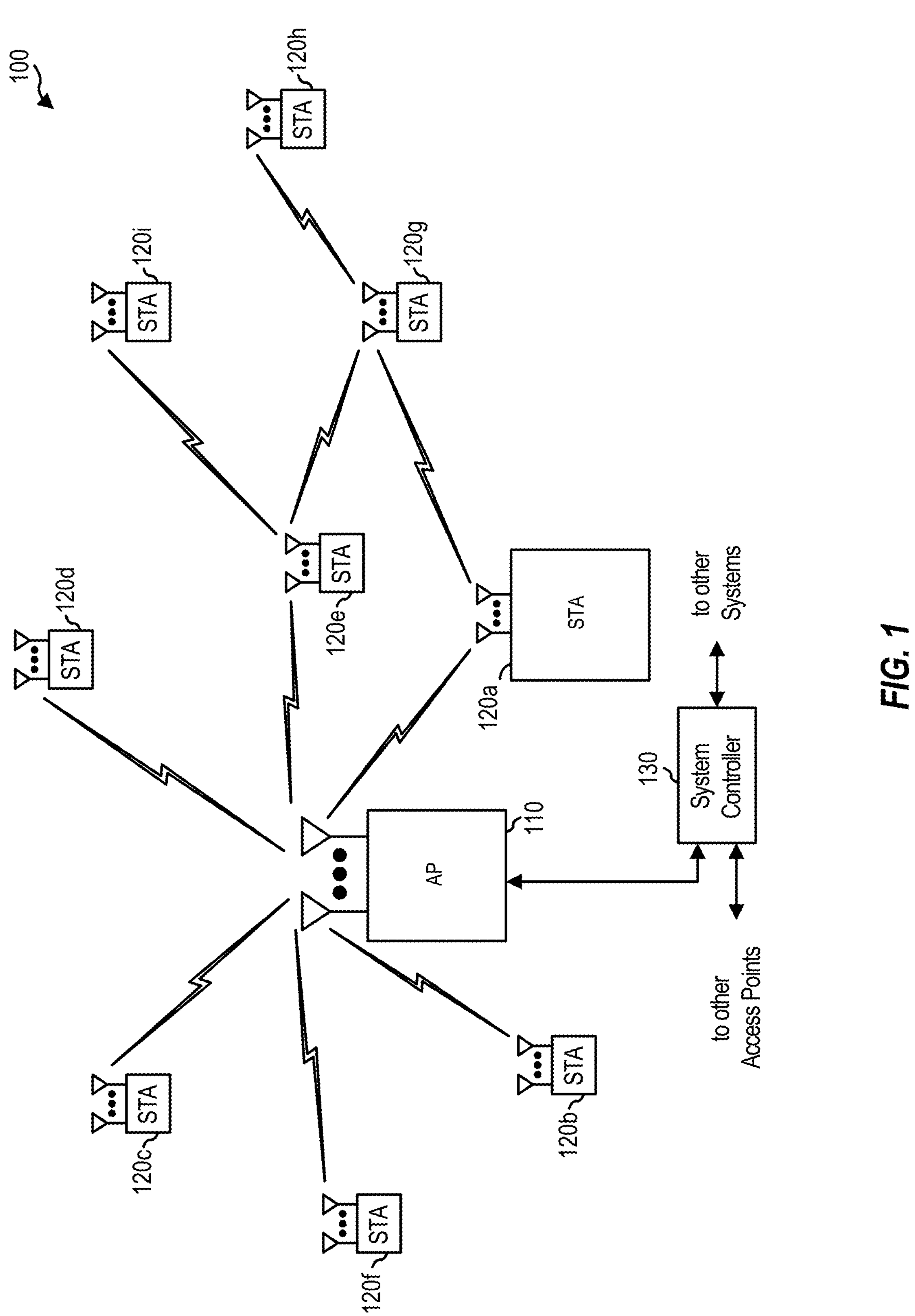
FIG. 1 depicts an example wireless communications network.

Aspects of the present disclosure provide apparatuses, methods, processing systems, and computer-readable mediums for wireless local area network make-before-break handover.

In conventional wireless communication systems, when a station (STA) roams between multiple access points (APs), the STA needs to re-associate with a new (target) AP and perform an association procedure (e.g., including a 4-way handshake procedure). The 4-way handshake procedure is the process of exchanging of four messages between an AP and a non-AP MLD to generate and exchange various encryption keys used encrypt data sent between the AP and STA. This four-message exchange may cause undue delay when a STA roams between APs, but needs to be performed before the network can switch the data path. Thus, this type of roaming or handover between APs is referred to as a break-before-make handover, because the connection to the serving AP is broken before the connection to the target AP is made, which creates data interruption and extra delay during the handover procedure.

To address this issue, techniques disclosed herein provide techniques address this issue, taking advantage of features of a multi-link operation (MLO) architecture. MLO generally refers to a feature in advanced wireless systems (e.g., such as that defined by the IEEE 802.11-2020 specification or amendments thereof including, but not limited to 802.11be Extremely High Throughput (EHT) and the 802.11 amendment associated with Wi-Fi 8)) that enables the utilization of multiple links using individual frequency channels to transmit and receive between devices. MLO may enable concurrent utilization of multiple radio links of different frequency channels/bands by an AP, a client, or both. A device capable of MLO is generally referred to as a multi-link device (MLD).

According to certain aspects of the present disclosure, non-collocated APs (i.e., APs present at different physical locations) may be connected as affiliated APs of a single AP MLD. As a result, when a STA (of a non-AP MLD) moves between these APs, the STA can bypass MLO (re)association and the 4-way handshake procedure. As a result, the technique proposed herein provide for a make-before-break handover procedure, which may avoid data interruption and reduce delay during handover.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120*a* includes an association manager 122 that may be configured to take one or more actions described herein. In aspects, AP 110 and wireless station 120*a* may be MLDs as further described herein with respect to FIG. 3.

For simplicity, only one AP 110 is shown in FIG. 1. An AP is generally a fixed station that communicates with the wireless STAs and may also be referred to as a base station (B S) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
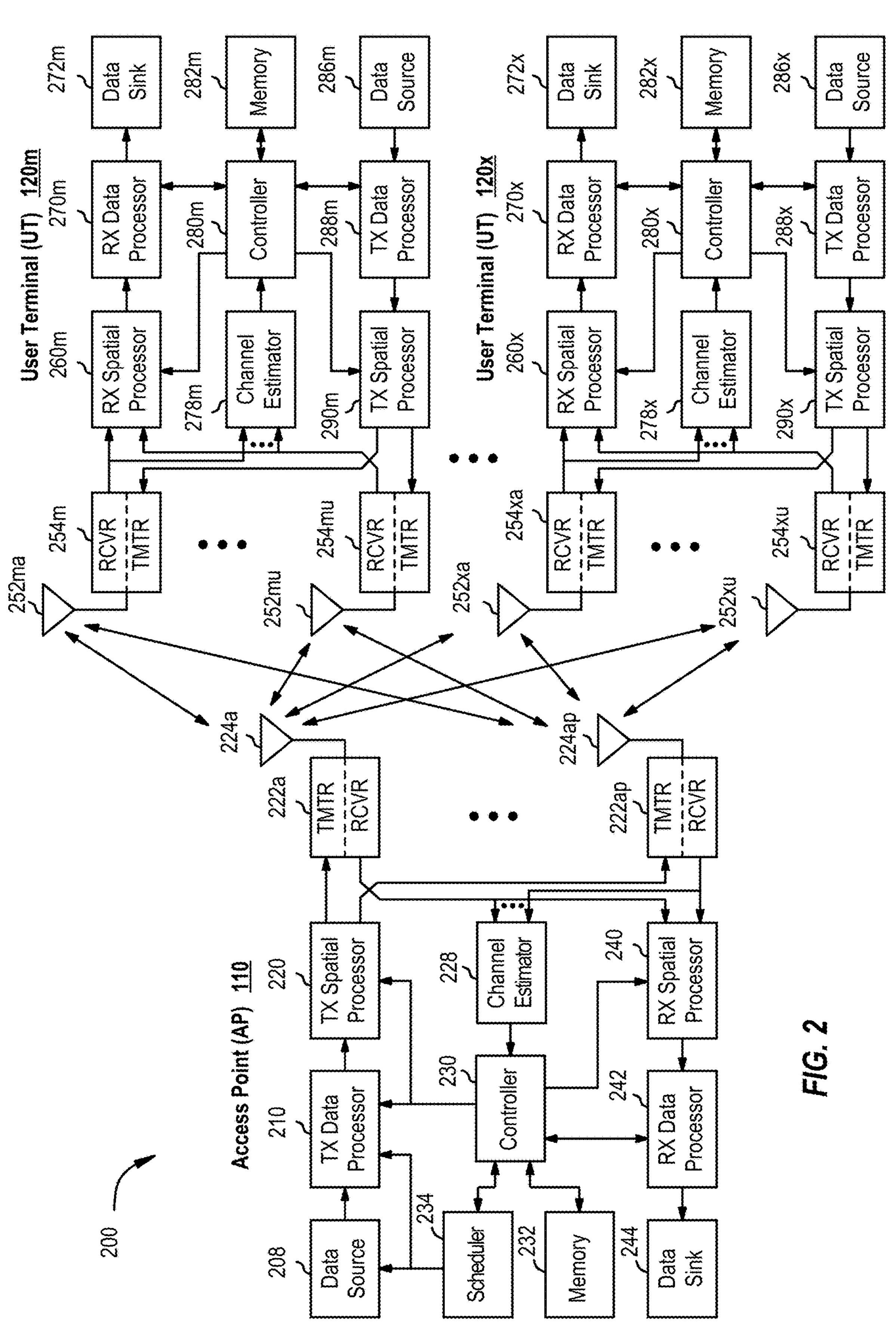
FIG. 2 depicts an example disaggregated base station architecture.

FIG. 2 illustrates a block diagram of AP 110 and two wireless STAs 120*m* and 120*x* in a MIMO/MLO system, such as system 100, in accordance with certain aspects of the present disclosure. In certain aspects, AP 110 and/or wireless STAs 120*m* and 120*x* may perform various techniques to ensure that a non-AP MLD is able to receive a group addressed frame. For example, AP 110 and/or wireless STAs 120*m* and 120*x* may include a respective association manager as described herein with respect to FIG. 1.

AP 110 is equipped with $N_{ap}$ antennas 224*a* through 224*t*. Wireless STA 120*m* is equipped with $N_{sta,m}$ antennas 252*ma* through 252*mu*, and wireless STA 120*x* is equipped with $N_{sta,x}$ antennas 252*xa* through 252*xu*. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224*a* through 224*ap* receive the UL signals from all $N_{UL}$ wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Multi-Link Devices

A multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 3:
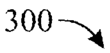
FIG. 3 depicts a block diagram of an example multi-link device (MLD) deployment.
Figure 3:
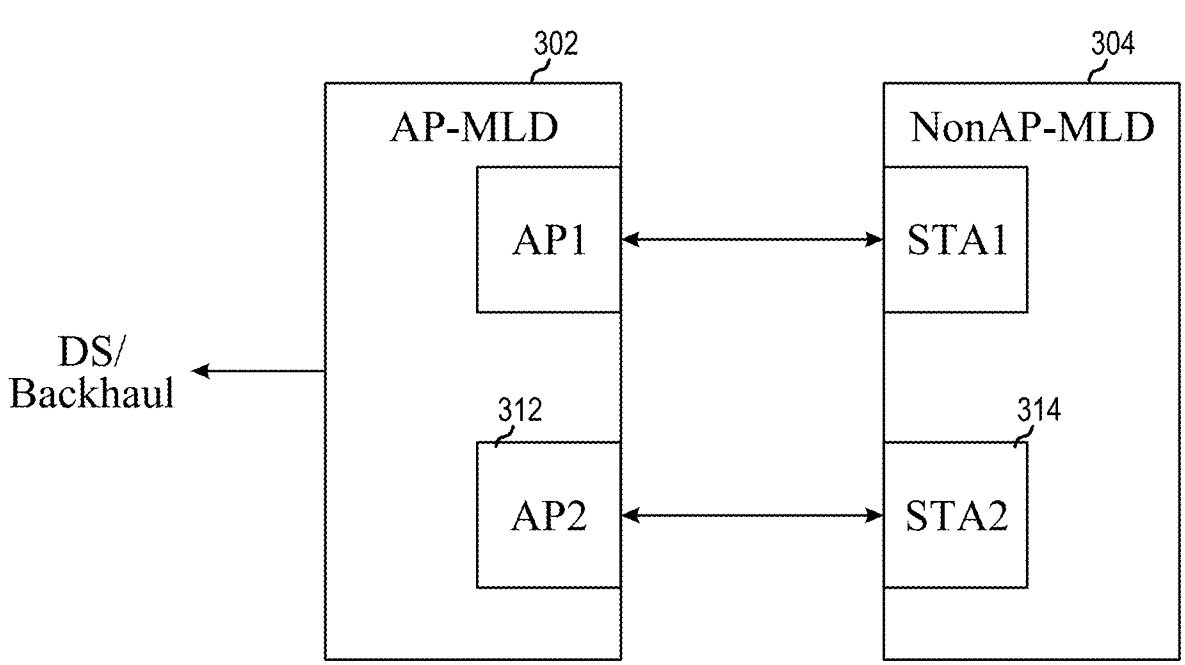

FIG. 3 shows a block diagram of an example MLD deployment 300. As shown in FIG. 3, an access point (AP) MLD 302 may communicate with a non-AP MLD 304. Each of the AP MLD and non-AP MLD may include at least two STA entities 314 (hereinafter also referred to simply as "STAs") that may communicate with associated STAs of another MLD. In an AP MLD, the STAs may be AP STAs 312 (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode. The Async mode provides flexibility to adapt to channel loading, allowing an MLD to perform channel access, transmit, and receive data via multiple links asynchronously. Sync mode may be preferred, however, if RF leakage exists between channels, because synchronized transmission on all links is unaffected by RF leakage.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also perform a backoff countdown on multiple wireless links as part of a channel access procedure. If a first link gains access to the medium through the channel access procedure, multiple links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to that STA's tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that gains access to the medium. The other wireless link may be blocked by in-device interference greater than −62 decibels per milliwatt (dBm). No aggregation gains may be realized in this mode.

Aspects Related to Wireless Local Area Network Make-Before-Break Handover

Aspects of the present disclosure provide apparatuses, methods, processing systems, and computer-readable mediums for wireless local area network make-before-break handover.

As noted above, conventional wireless communication systems typically only support a break-before-make handover procedure, requiring a STA to perform an association procedure when roaming between multiple APs. This approach creates data interruption and extra delay during the handover procedure.

Aspects of the present disclosure, however, support a make-before-break handover procedure, which may avoid data interruption and reduce delay during handover.

Figure 4:
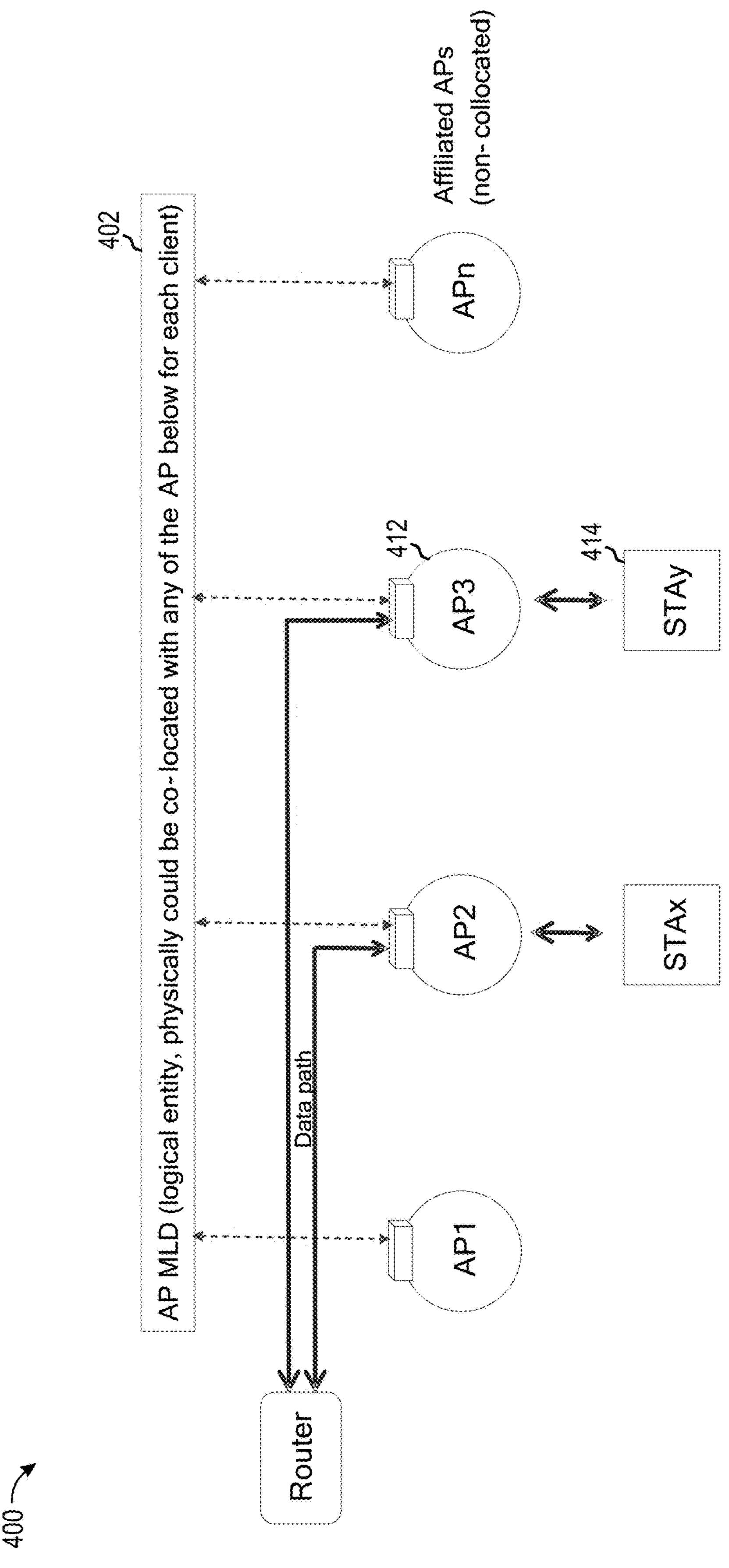
FIG. 4 depicts an example multi-link operation (MLO) architecture.

Aspects of the present disclosure may be implemented, for example, in the architecture multi-link operation (MLO) architecture illustrated in FIG. 4. The MLO architecture of FIG. 4 may allow non-collocated APs to be affiliated with a single AP MLD 402. In this manner, an AP MLD may be considered a logical entity which is collocated physically with any of a set of non-collocated APs 412 affiliated with the AP MLD.

Figure 5A:
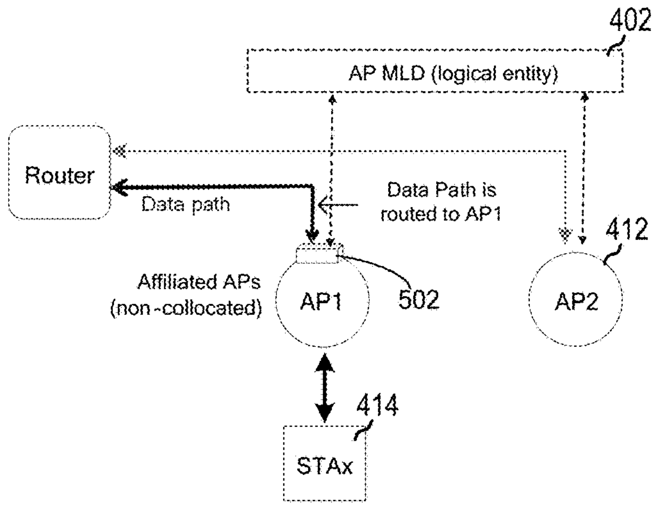
FIGS. 5A, 5B, and 5C depict an example make-before-break handover implemented in an MLO architecture.
Figure 5B:
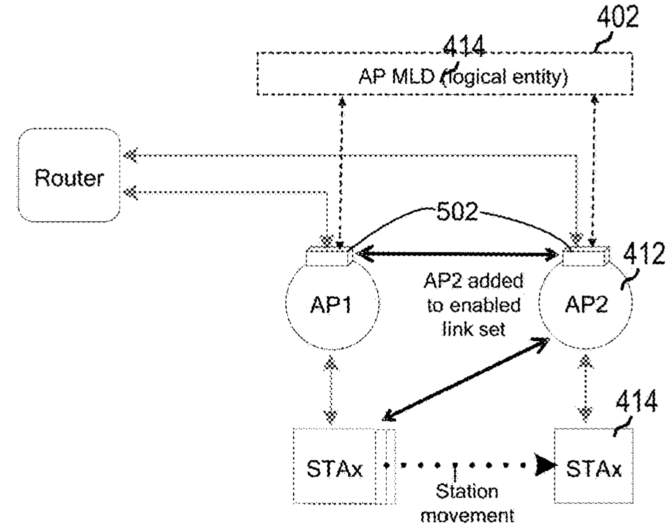
Figure 5C:
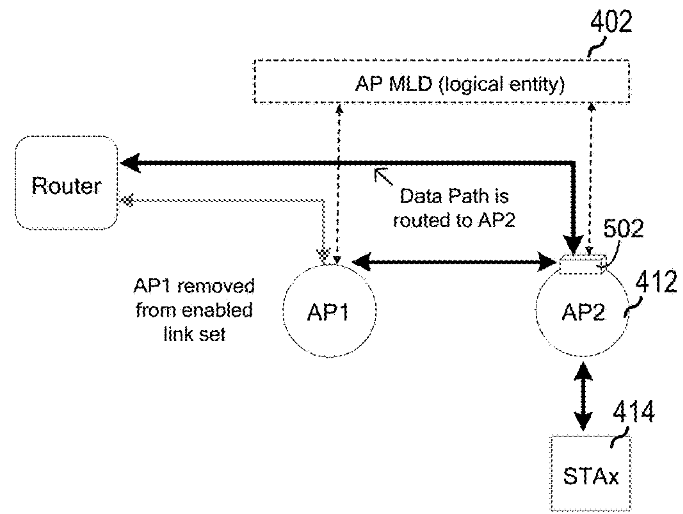

FIGS. 5A-5C illustrates example operations before, during, and after a make-before-break handover, in accordance with aspects of the present disclosure.

As illustrated in FIG. 5A, before the handover, a STA (e.g., STAx) within the MLO architecture has an active link with only a serving AP (AP1). At this point, the link with AP1 is in the only link in an enabled-link set and the data path is routed to AP1. AP1 hosts MLD context 502 for the client (e.g., STAx). While AP1 and the target AP (AP2) are collocated and may be affiliated within an associated link set, AP2 is not in the enabled-link set at this point.

As illustrated in FIG. 5B, however, as STAx moves towards AP2, the link to AP2 may be enabled during the make-before-break handover. This transition may occur where, as illustrated, the STAx moves closer to AP2. At this point, AP2 is added to the enabled link set alongside AP1 and both AP1 and AP2 exchange packets to client (as the link with AP2 was made before the link with AP1 was broken). Optionally, AP1 duplicates/forwards packets to AP2 as part of the transition.

As illustrated in FIG. 5C, after the transition, AP1 is removed from the enabled link set and the data path re-routed to AP2. At this point, AP2 hosts the MLD context for the client.

By implementing the multi-AP association described herein, data disruptions (e.g., MSDUs loss, duplicated MSDUs, or out-of-order MSDUs delivery) during handover may be mitigated. Thus, issues of delay and disruption present in typical MLO re-association or 4-way handshake procedures are avoided. Instead, there is minimal interruption and delay on the data path during handover. The multi-AP association also does not require association/association, or the related security steps. Implementation of the multi-AP association may allow mobility among a large number of APs (e.g., a single floor covered with 50 APs in an enterprise network).

According to aspects of the present disclosure, the make-before-break handover may be implemented within a multi-link architecture according to certain extensions In one example, certain mechanisms may be allowed for the client (e.g., a STA) to associate with a subset of the APs (associated link set), and then add/remove APs to the associated link set. In this case, it is not scalable for a non-AP MLD (e.g., a STA) to request and set up all the links at the same time. When a STA is deployed, only some of the APs are within range of the STA, so not all the links can be used concurrently, thus simultaneous set-up may not be necessary. Accordingly, an associated link set defined for a given STA may allow for better multi-AP association within the multi-link architecture.

In another example, certain mechanisms may be enabled for distribution system (DS) Backhaul to connect directly to the AP(s) serving the client (STA). This may imply that the backhaul/DS point of attachment moves when the client moves from an AP to another AP.

As noted above, multiple non-collocated APs within a network topology may be affiliated with a single AP MLD. There may be a large number of APs. For example, all APs in one company floor may belong to the same AP MLD. The non-AP MLD (e.g., STA) performs handover as it moves across the company floor.

According to certain aspects, MLO association and authentication may be implemented to enable a non-AP MLD to associate with the AP MLD. For example, 11be ML discovery may be extended and ML authentication and association, Pairwise Transient Key Security Association (PTKSA), block acknowledgment (BA), and the like, may be reused. In certain cases, an affiliated AP may advertise its neighboring APs in its beacon (and these neighboring APs may be identified as potential handover targets by a STA).

Figure 6A:
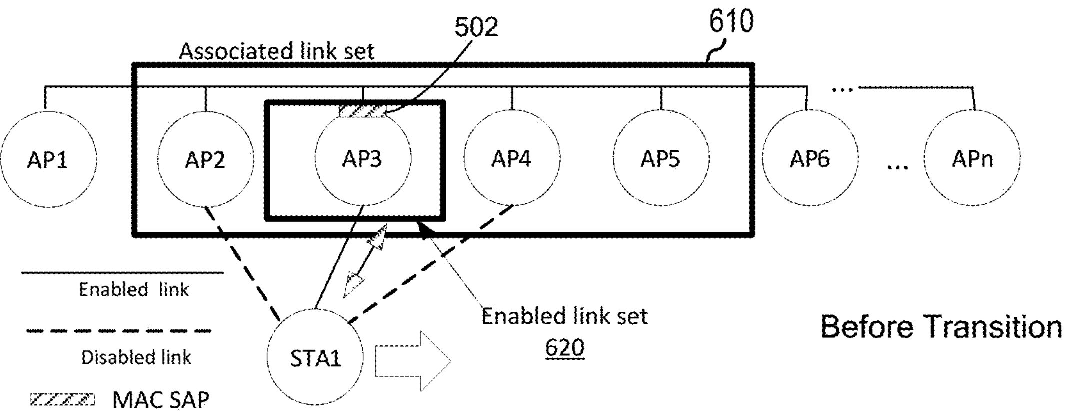
FIGS. 6A, 6B, and 6C depict an example associated link set and an example enable link set before, during, and after a make-before-break handover.
Figure 6B:
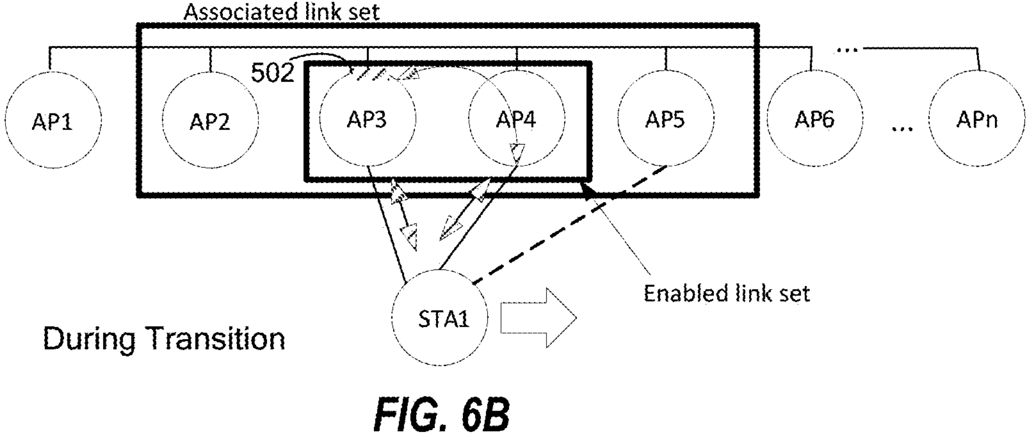
Figure 6C:
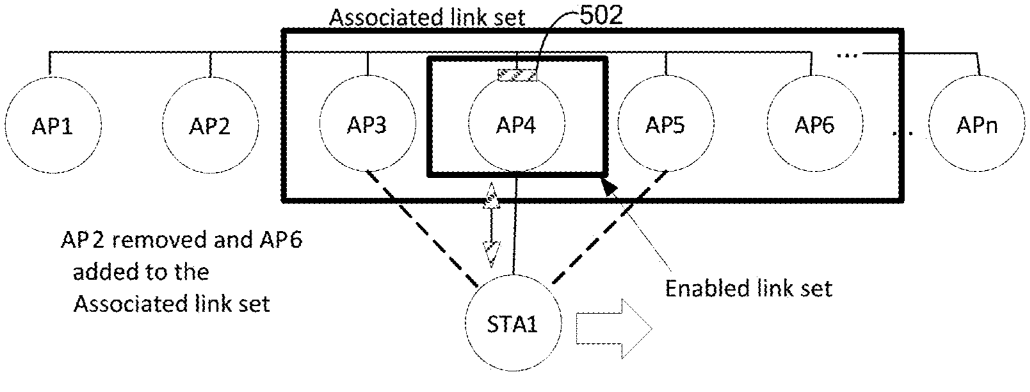

As illustrated in FIGS. 6A-6C, according to certain aspects, an associated link set may be maintained. An associated link set is a subset of the affiliated that are currently "associated" with the non-AP MLD. To maintain the associated link set, an affiliated AP may be added to the associated link set once it's in range (with threshold/time hysteresis). AN affiliated AP may be removed from the set once it's out-of-range (with threshold/time hysteresis). For example, existing 11be ML link reconfiguration may be used to add/remove link(s) dynamically without (re-)association. The enabled link set described herein is a subset of the associated link set.

FIGS. 6A-6C illustrate an example associated link set and an example enable link set before, during, and after a make-before break handover. In the example, STA1 (a non-AP MLD) moves to the right.

FIG. 6A illustrates an example associated link set and an example enable link set before the make-before-break handover. Here, AP2-AP5 are part of the associated link set. In this example, AP3 is currently serving the STA, so that (the link to) AP3 is the only member of the enabled link set and hosts the MDL context 502.

As illustrated in FIG. 6B, as the STA moves, a link to AP4 is enabled, without breaking the link to AP3. Here, the redundant link may be used for duplicated data exchange during handover.

As illustrated in FIG. 6C, after the handover, MLD context 502 is relocated from AP3 to AP4. In this example, AP3 is removed from the enabled link set, AP2 is removed from the associated link set, and AP6 added to the associated link set.

According to certain aspects, pre-handover preparation may occur on the network side. In some cases, an AP MLD may detect the presence of handover conditions. In other cases, handover can be triggered by the non-AP MLD itself (e.g., use auxiliary radio to look for target APs). Once handover is decided, network can initiate the handover transition stage. During the handover transition stage, duplicated packets may be sent on multiple links for reliability and reduced delay. Existing 11be MLD procedures and signaling may be used to remove any duplicated packets. The MLD context (e.g., association, authentication, BA) may be relocated to the new (anchor) AP and duplicated transmission may be terminated.

Implementation of techniques described herein may reuse certain existing 11be mechanisms. For example, ML setup (e.g., association and authentication, PTKSA, BA, and the like) and ML reconfiguration (to add/remove link(s)) for the enabled link set may be reused. Additionally, an AP beacon may include neighboring APs. The associated link set may be maintained. The medium access control (MAC) serving AP (SAP) and MLD context may be maintained.

Figure 7:
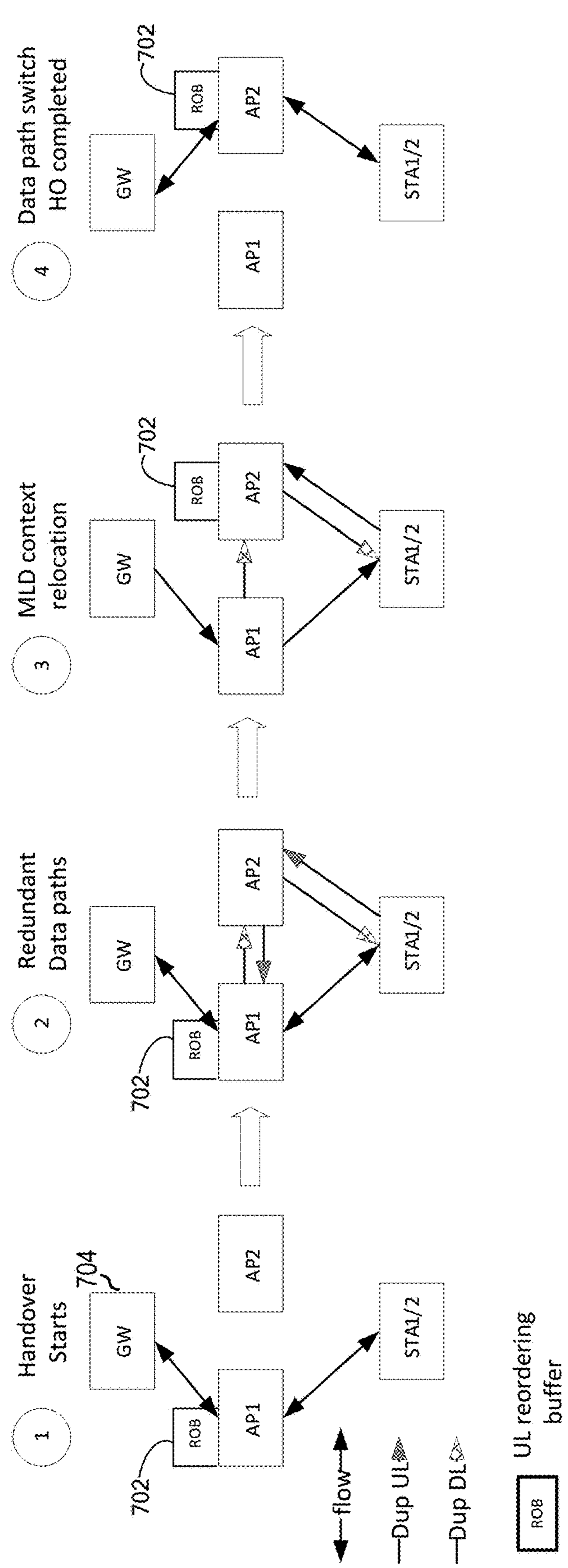
FIG. 7 depicts an example transfer of multi-link device (MLD) context including a handover buffer during a make-before-break handover.

An example make before break-procedure is illustrated in FIG. 7. As illustrated, in an initial state (1), a gateway (GW) 704 may be connected to AP1, and all traffic goes through AP1. In this example, AP1 has an uplink (UL) reordering buffer (ROB) 702.

As shown at (2), handover to AP2 begins. First, downlink (DL) duplication is initiated where AP1 may start to duplicate DL packets, by forwarding the DL packets to AP2. Upon receipt, AP2 sends the DL packets to STA2. UL duplication may also begin when STA2 starts to duplicate UL packets and sends the dup to AP2, for example, over-the-air (OTA Sig 1). In one case, AP2 buffers all UL packets received at the ROB, without forwarding the packets to the gateway (otherwise, the packet may be received out of order at the gateway). In an alternative case, AP2 forwards all received UL packets to AP1 for reordering.

As shown at (3), after UL packets are forwarded, the MLD context may be relocated. MLD context location is based on agreed timer and an UL sequence number (SN) value, among other things. MLD context may comprise any of association context, security context, block-ACK (BA) sessions, TID-to-link mapping, a DL packets buffer, the ROB, and PN (packet number). During the MLD context relocation, AP1 terminates sending UL packets to gateway, then sends the MLD context to AP2, while STA1 may stop transmission to AP1 (OTA Sig2).

After relocation, at (4), AP2 may receive uplink packets and combine them with its local RO buffer. AP2 starts to send UL packets to the gateway, while AP2 stops forwarding UL packets to AP1 (if it has been forwarding the packets to AP1). In some cases, AP2 sends a "switch path layer 2 (L2) message" to the gateway, and the gateway switches data path to AP2. To finish the handover procedure, AP2 may send a handover "done msg" to AP1. AP1 stops DL transmission and clears any unsent DL packets.

Figure 8:
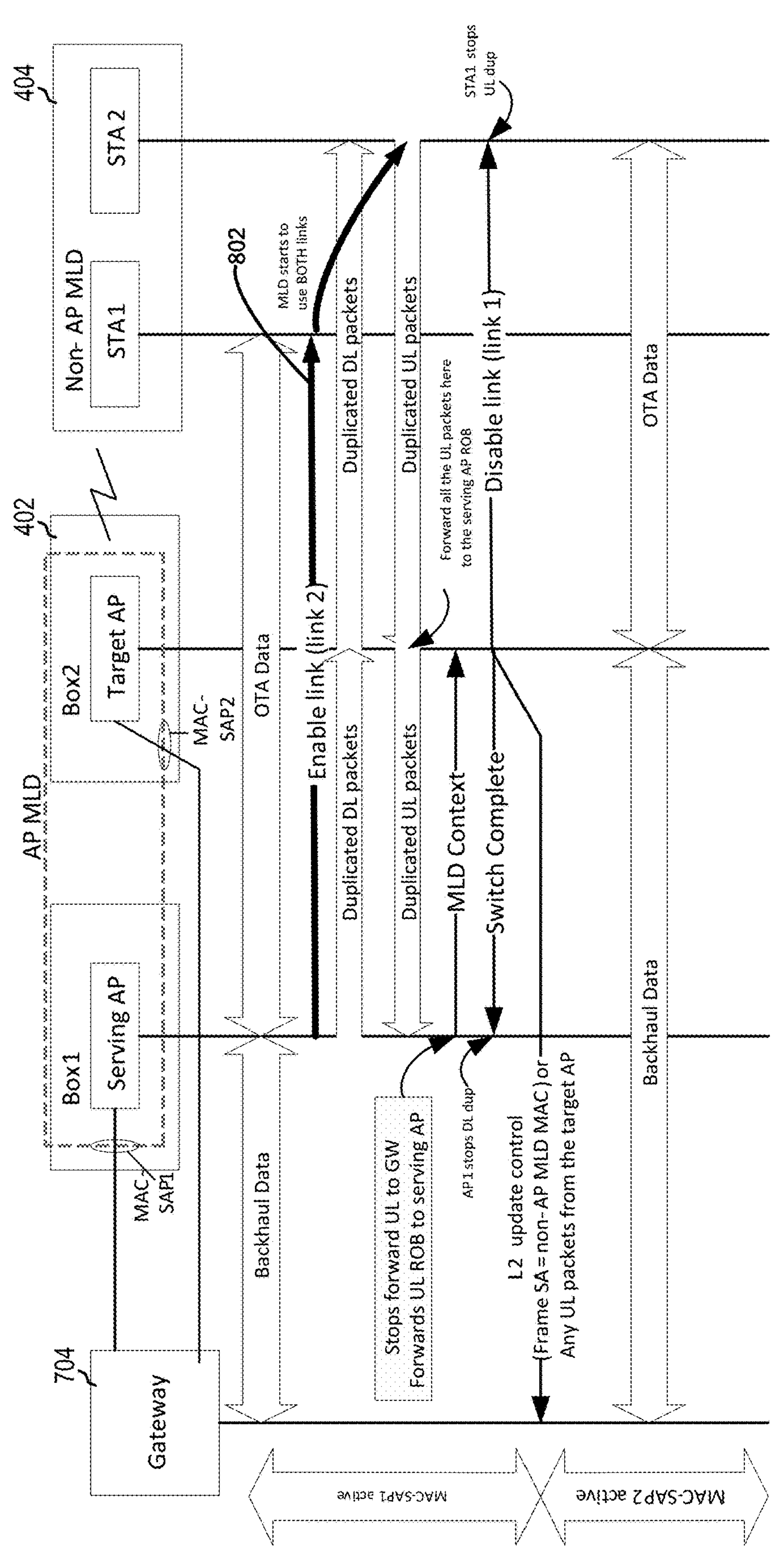
FIG. 8 depicts an example call flow for a network initiated make-before break handover.
Figure 9:
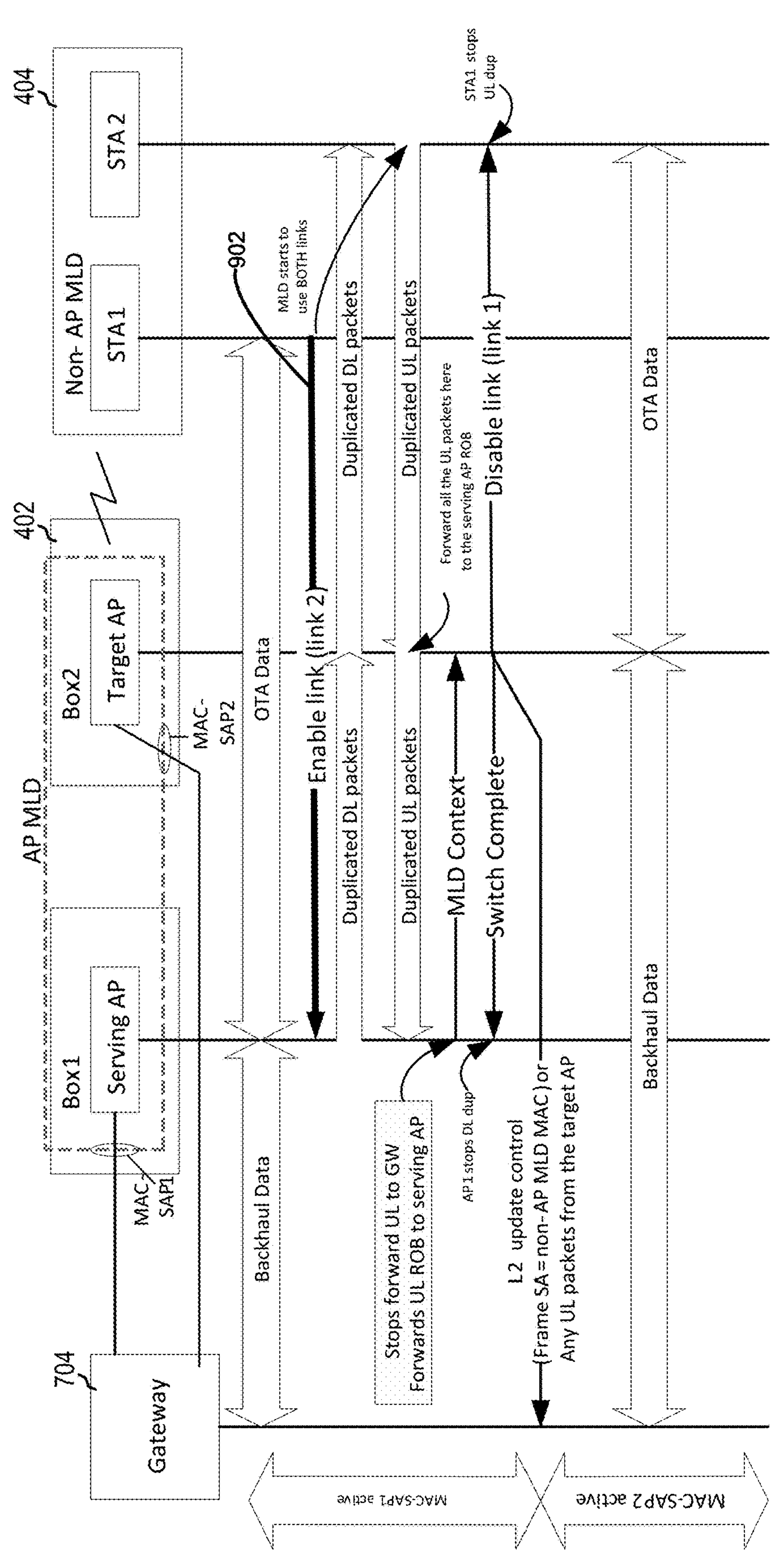
FIG. 9 depicts an example call flow for a client initiated make-before break handover.

As illustrated in FIG. 8 and FIG. 9, respectively, make-before-break handover may be initiated by the network or the client, respectively.

As illustrated in FIG. 8, assuming an initial state where the Non-AP MLD STA(s) are served by a serving AP (located at Box 1). In this case, the serving AP may initiate the handover by sending a message for the STA to enable a link to the target AP (in Box 2). The operations then proceed as discussed above, where the MLD starts to use both links during the handover. To signal an end of the handover, the target AP may send a message for the STA to disable Link 1 to AP1 and may send a message to AP1 that the switch is complete.

As illustrated in FIG. 9, for the client-initiated make-before-break handover procedure, the STA may send a message to the Serving AP to enable Link 2 to the Target AP. The other operations may proceed as described above, with reference to the network-initiated make-before-break handover procedure.

Example Operations of a Wireless Station

Figure 10:
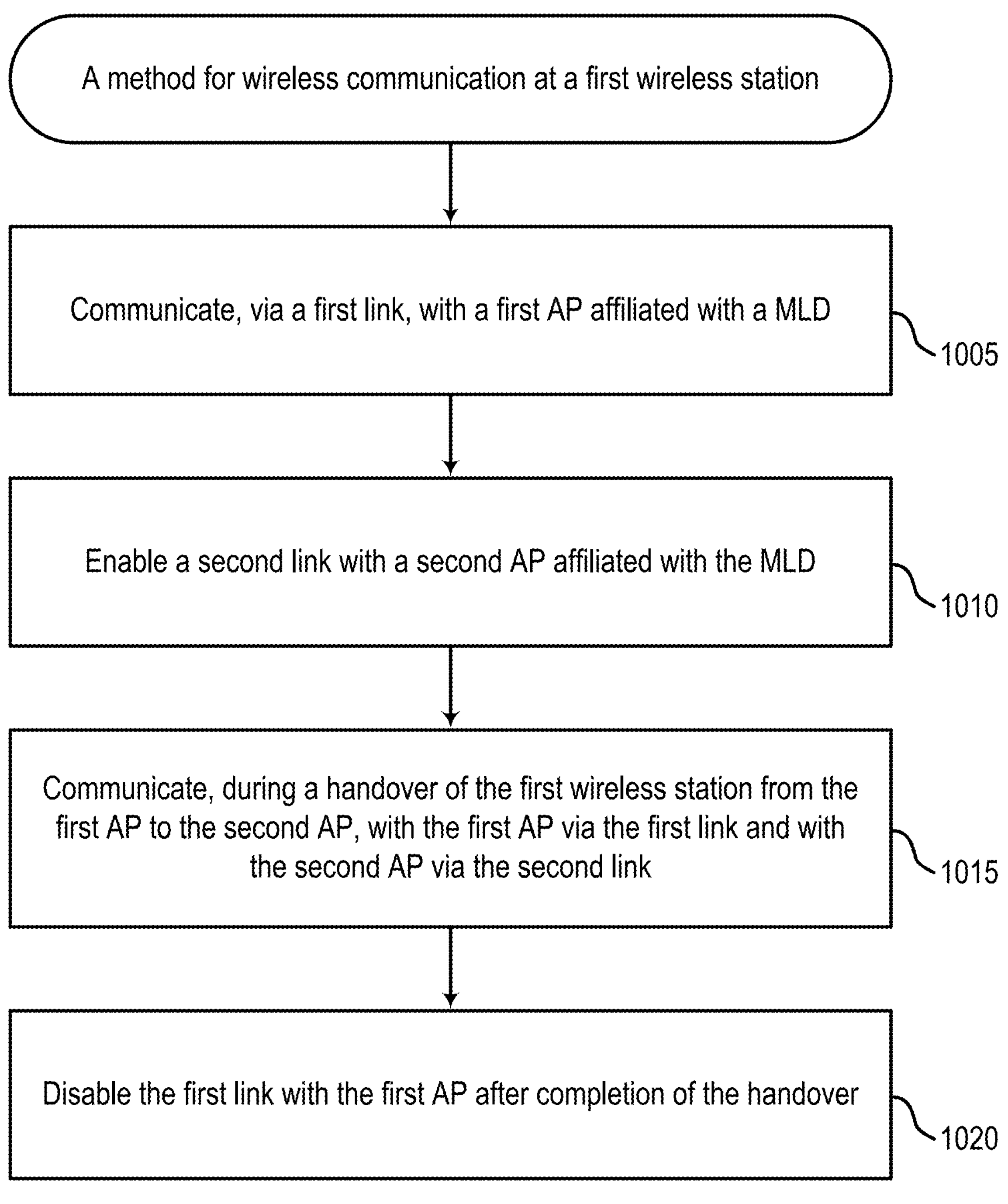
FIG. 10 depicts a flowchart illustrating an example method for wireless communication.

FIG. 10 shows an example of a method 1000 for wireless communication at a first wireless station. In some examples, the first wireless station is a station, such as STA 120 of FIGS. 1 and 2.

Method 1000 begins at step 1005 with communicating, via a first link, with a first AP affiliated with a MLD. In some cases, the operations of this step refer to, or may be performed by, circuitry for communicating and/or code for communicating as described with reference to FIG. 13.

Method 1000 then proceeds to step 1010 with enabling a second link with a second AP affiliated with the MLD. In some cases, the operations of this step refer to, or may be performed by, circuitry for enabling and/or code for enabling as described with reference to FIG. 13.

Method 1000 then proceeds to step 1015 with communicating, during a handover of the first wireless station from the first AP to the second AP, with the first AP via the first link and with the second AP via the second link. In some cases, the operations of this step refer to, or may be performed by, circuitry for communicating and/or code for communicating as described with reference to FIG. 13.

Method 1000 then proceeds to step 1020 with disabling the first link with the first AP after completion of the handover. In some cases, the operations of this step refer to, or may be performed by, circuitry for disabling and/or code for disabling as described with reference to FIG. 13.

In some aspects, the second link is a member of an associated link set when the second link is enabled.

In some aspects, the method 1000 further includes adding, to the associated link set, a third link associated with a third AP affiliated with the MLD. In some cases, the operations of this step refer to, or may be performed by, circuitry for adding and/or code for adding as described with reference to FIG. 13.

In some aspects, the method 1000 further includes removing, from the associated link set, a fourth link associated with a fourth AP affiliated with the MLD. In some cases, the operations of this step refer to, or may be performed by, circuitry for removing and/or code for removing as described with reference to FIG. 13.

In some aspects, the method 1000 further includes obtaining a beacon from the first AP. In some cases, the operations of this step refer to, or may be performed by, circuitry for obtaining and/or code for obtaining as described with reference to FIG. 13.

In some aspects, the method 1000 further includes identifying at least the second AP and third AP based on information in the beacon. In some cases, the operations of this step refer to, or may be performed by, circuitry for identifying and/or code for identifying as described with reference to FIG. 13.

In some aspects, the communicating, during the handover, with the first AP via the first link and with the second AP via the second link comprises at least one of: obtaining duplicate first packets via both the first link and the second link; or outputting duplicate second packets for transmission via both the first link and second link.

In some aspects, the method 1000 further includes obtaining signaling from the first AP indicating the wireless station is to enable the second link, wherein the wireless station enables the second link after obtaining the signaling. In some cases, the operations of this step refer to, or may be performed by, circuitry for obtaining and/or code for obtaining as described with reference to FIG. 13.

In some aspects, the method 1000 further includes outputting, for transmission, signaling to the first AP initiating the handover, wherein the wireless station enables the second link after outputting the signaling. In some cases, the operations of this step refer to, or may be performed by, circuitry for outputting and/or code for outputting as described with reference to FIG. 13.

In some aspects, the method 1000 further includes obtaining signaling from the second AP indicating the wireless station is to disable the first link, wherein the wireless station disables the first link after obtaining the signaling. In some cases, the operations of this step refer to, or may be performed by, circuitry for obtaining and/or code for obtaining as described with reference to FIG. 13.

Figure 13:
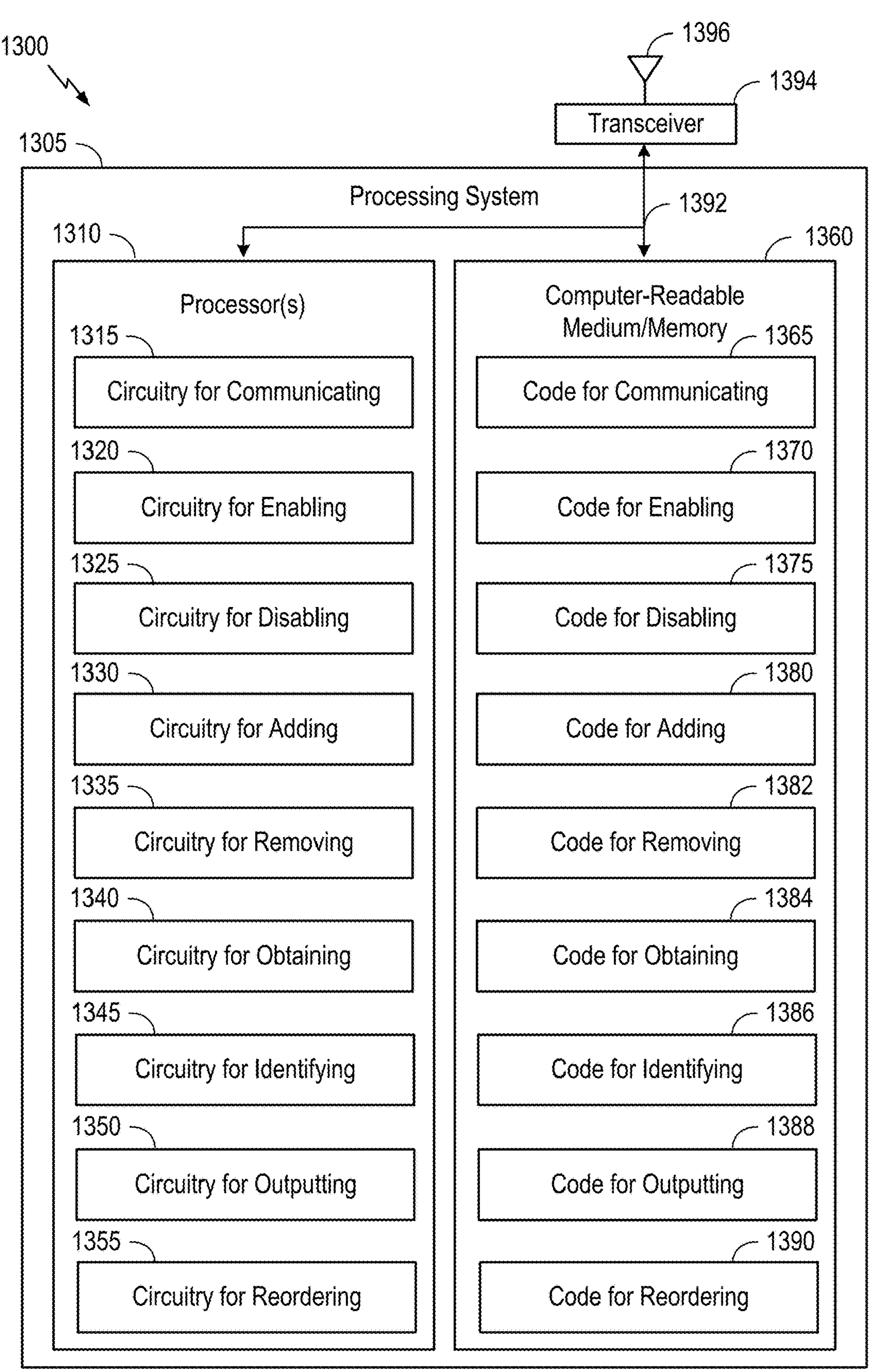
FIG. 13 depicts a block diagram of an example wireless communications device.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Example Operations of Access Points

Figure 11:
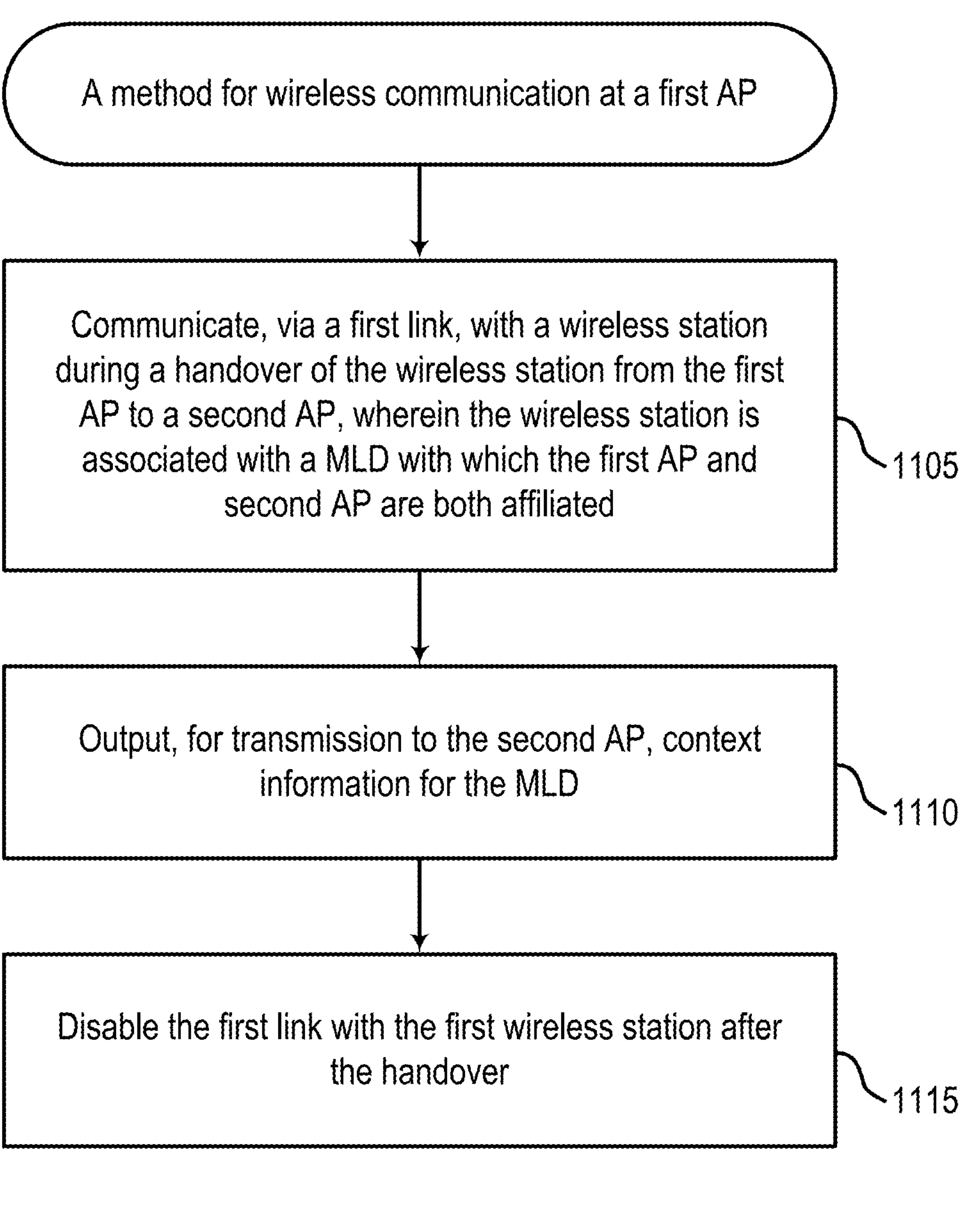
FIG. 11 depicts a flowchart illustrating an example method for wireless communication.

FIG. 11 shows an example of a method 1100 for wireless communication at a first AP. In some examples, the first AP is an access point, such as an AP 110 of FIGS. 1 and 2.

Method 1100 begins at step 1105 with communicating, via a first link, with a wireless station during a handover of the wireless station from the first AP to a second AP, wherein the wireless station is associated with a MLD with which the first AP and second AP are both affiliated. In some cases, the operations of this step refer to, or may be performed by, circuitry for communicating and/or code for communicating as described with reference to FIG. 13.

Method 1100 then proceeds to step 1110 with outputting, for transmission to the second AP, context information for the MLD. In some cases, the operations of this step refer to, or may be performed by, circuitry for outputting and/or code for outputting as described with reference to FIG. 13.

Method 1100 then proceeds to step 1115 with disabling the first link with the first wireless station after the handover. In some cases, the operations of this step refer to, or may be performed by, circuitry for disabling and/or code for disabling as described with reference to FIG. 13.

In some aspects, the context information for the MLD comprises information regarding at least one of: association context, security context, or TID to link mapping, one or more BA sessions, a downlink packet buffer, an uplink packet re-ordering buffer, a SN, or a PN.

In some aspects, the method 1100 further includes outputting for transmission a beacon identifying at least the second AP. In some cases, the operations of this step refer to, or may be performed by, circuitry for outputting and/or code for outputting as described with reference to FIG. 13.

In some aspects, communicating with the wireless station during the handover comprises at least one of: outputting duplicate first packets for transmission to both the wireless station via the first link and to the second AP; or obtaining duplicate second packets from both the wireless station via the first link and from the second AP.

In some aspects, the method 1100 further includes reordering the duplicate second packets. In some cases, the operations of this step refer to, or may be performed by, circuitry for reordering and/or code for reordering as described with reference to FIG. 13.

In some aspects, the method 1100 further includes outputting signaling to the wireless station indicating the wireless station is to disable the first link for communicating with the second AP. In some cases, the operations of this step refer to, or may be performed by, circuitry for outputting and/or code for outputting as described with reference to FIG. 13.

In some aspects, the method 1100 further includes obtaining signaling from the wireless station initiating the handover. In some cases, the operations of this step refer to, or may be performed by, circuitry for obtaining and/or code for obtaining as described with reference to FIG. 13.

In some aspects, the method 1100 further includes obtaining signaling from the second AP indicating the handover is complete. In some cases, the operations of this step refer to, or may be performed by, circuitry for obtaining and/or code for obtaining as described with reference to FIG. 13.

In some aspects, the context information for the MLD is output for transmission based on at least one of a timer or uplink sequence number.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
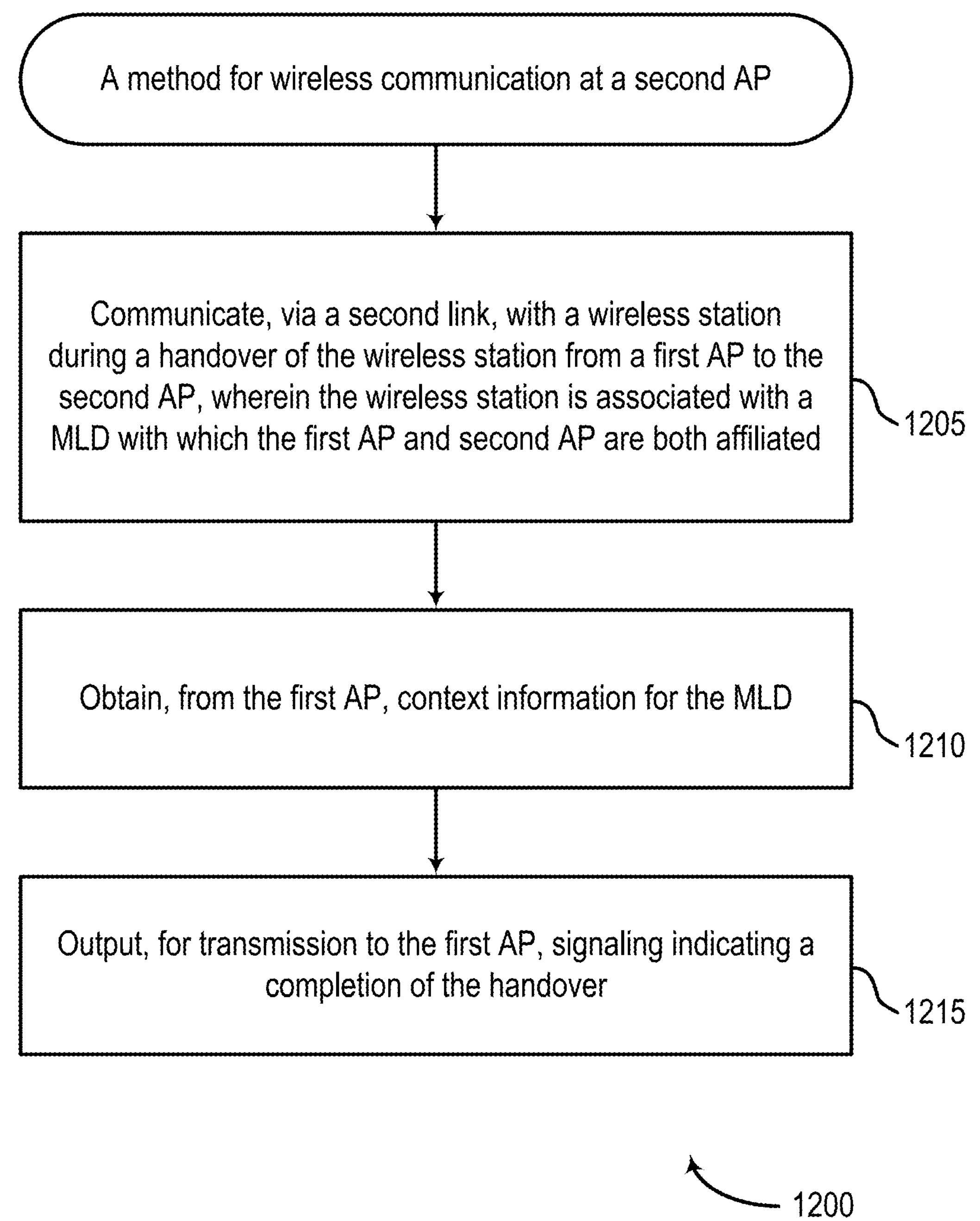
FIG. 12 depicts a flowchart illustrating an example method for wireless communication.

FIG. 12 shows an example of a method 1200 for wireless communication at a second AP. In some examples, the second AP is an access point, such as an AP 110 of FIGS. 1 and 2.

Method 1200 begins at step 1205 with communicating, via a second link, with a wireless station during a handover of the wireless station from a first AP to the second AP, wherein the wireless station is associated with a MLD with which the first AP and second AP are both affiliated. In some cases, the operations of this step refer to, or may be performed by, circuitry for communicating and/or code for communicating as described with reference to FIG. 13.

Method 1200 then proceeds to step 1210 with obtaining, from the first AP, context information for the MLD. In some cases, the operations of this step refer to, or may be performed by, circuitry for obtaining and/or code for obtaining as described with reference to FIG. 13.

Method 1200 then proceeds to step 1215 with outputting, for transmission to the first AP, signaling indicating a completion of the handover. In some cases, the operations of this step refer to, or may be performed by, circuitry for outputting and/or code for outputting as described with reference to FIG. 13.

In some aspects, the context information for the MLD comprises information regarding at least one of: association context, security context, or TID to link mapping, one or more BA sessions, a downlink packet buffer, an uplink packet re-ordering buffer, a SN, or a PN.

In some aspects, the method 1200 further includes outputting for transmission a beacon identifying one or more neighbor APs of the second AP. In some cases, the operations of this step refer to, or may be performed by, circuitry for outputting and/or code for outputting as described with reference to FIG. 13.

In some aspects, communicating with the wireless station during the handover comprises at least one of: outputting duplicate packets for transmission to both the wireless station via the second link and to the first AP; or obtaining duplicate packets from both the wireless station via the second link and from the first AP.

In some aspects, the method 1200 further includes outputting, for transmission, the duplicate packets to the first AP for reordering. In some cases, the operations of this step refer to, or may be performed by, circuitry for outputting and/or code for outputting as described with reference to FIG. 13.

In some aspects, the method 1200 further includes outputting, for transmission, signaling to the first AP indicating the handover is complete. In some cases, the operations of this step refer to, or may be performed by, circuitry for outputting and/or code for outputting as described with reference to FIG. 13.

In some aspects, the method 1200 further includes outputting, for transmission, signaling for a gateway to switch a data path from the first AP to the second AP. In some cases, the operations of this step refer to, or may be performed by, circuitry for outputting and/or code for outputting as described with reference to FIG. 13.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device

FIG. 13 depicts aspects of an example communications device 1300. In some aspects, communications device 1300 is a station, such as a STA 120 described above with respect to FIGS. 1 and 2. In some aspects, communications device 1300 is an AP, such as an AP 110 described above with respect to FIGS. 1 and 2.

The communications device 1300 includes a processing system 1305 coupled to the transceiver 1394 (e.g., a transmitter and/or a receiver). The transceiver 1394 is configured to transmit and receive signals for the communications device 1300 via the antenna 1396, such as the various signals as described herein. The transceiver 1394 may be an example of aspects of transceiver 222 and/or transceiver 254 described with reference to FIG. 2. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of the RX data processor 270, the TX data processor 288, the TX spatial processor 290, or the controller 280 of STA 120 illustrated in FIG. 2. In various aspects, the one or more processors 1310 may be representative of one or more of the RX data processor 242, the TX data processor 210, the TX spatial processor 220, or the controller 230 of AP 110 illustrated in FIG. 2. The one or more processors 1310 are coupled to a computer-readable medium/memory 1360 via a bus 1392. In certain aspects, the computer-readable medium/memory 1360 is configured to store instructions (e.g., computer-executable code) that when executed by the one or more processors 1310, cause the one or more processors 1310 to perform: the method 1000 described with respect to FIG. 10, or any aspect related to it; the method 1100 described with respect to FIG. 11, or any aspect related to it; and/or the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1360 stores code (e.g., executable instructions), such as code for communicating 1365, code for enabling 1370, code for disabling 1375, code for adding 1380, code for removing 1382, code for obtaining 1384, code for identifying 1386, code for outputting 1388, and code for reordering 1390. Processing of the code for communicating 1365, code for enabling 1370, code for disabling 1375, code for adding 1380, code for removing 1382, code for obtaining 1384, code for identifying 1386, code for outputting 1388, and code for reordering 1390 may cause the communications device 1300 to perform: the method 1000 described with respect to FIG. 10, or any aspect related to it; the method 1100 described with respect to FIG. 11, or any aspect related to it; and/or the method 1200 described with respect to FIG. 12, or any aspect related to it.

The one or more processors 1310 include circuitry configured to implement (e.g., execute) the code stored in the computer-readable medium/memory 1360, including circuitry such as circuitry for communicating 1315, circuitry for enabling 1320, circuitry for disabling 1325, circuitry for adding 1330, circuitry for removing 1335, circuitry for obtaining 1340, circuitry for identifying 1345, circuitry for outputting 1350, and circuitry for reordering 1355. Processing with circuitry for communicating 1315, circuitry for enabling 1320, circuitry for disabling 1325, circuitry for adding 1330, circuitry for removing 1335, circuitry for obtaining 1340, circuitry for identifying 1345, circuitry for outputting 1350, and circuitry for reordering 1355 may cause the communications device 1300 to perform: the method 1000 described with respect to FIG. 10, or any aspect related to it; the method 1100 described with respect to FIG. 11, or any aspect related to it; and/or the method 1200 described with respect to FIG. 12, or any aspect related to it.

Various components of the communications device 1300 may provide means for performing: the method 1000 described with respect to FIG. 10, or any aspect related to it; the method 1100 described with respect to FIG. 11, or any aspect related to it; and/or the method 1200 described with respect to FIG. 12, or any aspect related to it. For example, in some cases, means for transmitting, sending or outputting for transmission may include the transmitter unit 254 or antenna(s) 252 of the STA 120 illustrated in FIG. 2 and/or the transceiver 1394 and the antenna 1396 of the communications device 1300 in FIG. 13. In some cases, means for transmitting, sending or outputting for transmission may include the transmitter unit 222 or an antenna(s) 224 of AP 110 illustrated in FIG. 2 and/or the transceiver 1394 and the antenna 1396 of the communications device 1300 in FIG. 13. In some aspects, means for receiving or obtaining may include the receiver unit 254 or antenna(s) 252 of STA 120 illustrated in FIG. 2 and/or the transceiver 1394 and the antenna 1396 of the communications device 1300 in FIG. 13. In some aspects, means for receiving or obtaining may include the receiver unit 222 or an antenna(s) 224 of AP 110 illustrated in FIG. 2 and/or the transceiver 1394 and the antenna 1396 of the communications device 1300 in FIG. 13. In some aspects, means for enabling, means for disabling, means for communicating, means for adding, means for removing, means for obtaining, means for identifying, and/or means for reordering may include one or more of the processors illustrated in FIG. 2.

Example Clauses

Implementation examples are described in the following numbered clauses:

Clause 1: A method for wireless communication at a first wireless station, comprising: communicating, via a first link, with a first AP affiliated with a MLD; enabling a second link with a second AP affiliated with the MLD; communicating, during a handover of the first wireless station from the first AP to the second AP, with the first AP via the first link and with the second AP via the second link; and disabling the first link with the first AP after completion of the handover.

Clause 2: The method of Clause 1, wherein the second link is a member of an associated link set when the second link is enabled.

Clause 3: The method of Clause 2, further comprising at least one of: adding, to the associated link set, a third link associated with a third AP affiliated with the MLD; or removing, from the associated link set, a fourth link associated with a fourth AP affiliated with the MLD.

Clause 4: The method of Clause 3, further comprising: obtaining a beacon from the first AP; and identifying at least the second AP and third AP based on information in the beacon.

Clause 5: The method of any one of Clauses 1-4, wherein the communicating, during the handover, with the first AP via the first link and with the second AP via the second link comprises at least one of: obtaining duplicate first packets via both the first link and the second link; or outputting duplicate second packets for transmission via both the first link and second link.

Clause 6: The method of any one of Clauses 1-5, further comprising: obtaining signaling from the first AP indicating the wireless station is to enable the second link, wherein the wireless station enables the second link after obtaining the signaling.

Clause 7: The method of any one of Clauses 1-6, further comprising: outputting, for transmission, signaling to the first AP initiating the handover, wherein the wireless station enables the second link after outputting the signaling.

Clause 8: The method of any one of Clauses 1-7, further comprising: obtaining signaling from the second AP indicating the wireless station is to disable the first link, wherein the wireless station disables the first link after obtaining the signaling.

Clause 9: A method for wireless communication at a first AP, comprising: communicating, via a first link, with a wireless station during a handover of the wireless station from the first AP to a second AP, wherein the wireless station is associated with a MLD with which the first AP and second AP are both affiliated; outputting, for transmission to the second AP, context information for the MLD; and disabling the first link with the first wireless station after the handover.

Clause 10: The method of Clause 9, wherein the context information for the MLD comprises information regarding at least one of: association context, security context, or TID to link mapping, one or more BA sessions, a downlink packet buffer, an uplink packet re-ordering buffer, a SN, or a PN.

Clause 11: The method of any one of Clauses 9 and 10, further comprising: outputting for transmission a beacon identifying at least the second AP.

Clause 12: The method of any one of Clauses 9-11, wherein communicating with the wireless station during the handover comprises at least one of: outputting duplicate first packets for transmission to both the wireless station via the first link and to the second AP; or obtaining duplicate second packets from both the wireless station via the first link and from the second AP.

Clause 13: The method of Clause 12, further comprising: reordering the duplicate second packets.

Clause 14: The method of any one of Clauses 9-13, further comprising: outputting signaling to the wireless station indicating the wireless station is to disable the first link for communicating with the second AP.

Clause 15: The method of any one of Clauses 9-14, further comprising: obtaining signaling from the wireless station initiating the handover.

Clause 16: The method of any one of Clauses 9-15, further comprising: obtaining signaling from the second AP indicating the handover is complete.

Clause 17: The method of any one of Clauses 9-16, wherein the context information for the MLD is output for transmission based on at least one of a timer or uplink sequence number.

Clause 18: A method for wireless communication at a second AP, comprising: communicating, via a second link, with a wireless station during a handover of the wireless station from a first AP to the second AP, wherein the wireless station is associated with a MLD with which the first AP and second AP are both affiliated; obtaining, from the first AP, context information for the MLD; and outputting, for transmission to the first AP, signaling indicating a completion of the handover.

Clause 19: The method of Clause 18, wherein the context information for the MLD comprises information regarding at least one of: association context, security context, or TID to link mapping, one or more BA sessions, a downlink packet buffer, an uplink packet re-ordering buffer, a SN, or a PN.

Clause 20: The method of any one of Clauses 18 and 19, further comprising: outputting for transmission a beacon identifying one or more neighbor APs of the second AP.

Clause 21: The method of any one of Clauses 18-20, wherein communicating with the wireless station during the handover comprises at least one of: outputting duplicate packets for transmission to both the wireless station via the second link and to the first AP; or obtaining duplicate packets from both the wireless station via the second link and from the first AP.

Clause 22: The method of Clause 21, further comprising: outputting, for transmission, the duplicate packets to the first AP for reordering.

Clause 23: The method of any one of Clauses 18-22, further comprising: outputting, for transmission, signaling to the first AP indicating the handover is complete.

Clause 24: The method of any one of Clauses 18-23, further comprising: outputting, for transmission, signaling for a gateway to switch a data path from the first AP to the second AP.

Clause 25: An apparatus, comprising: a memory comprising executable instructions; and a processor configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by a processor of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Clause 29: A wireless station, comprising: at least one transceiver; a memory comprising instructions; and one or more processors configured to execute the instructions and cause the wireless station to perform a method in accordance with any one of Clauses 1-8, wherein the at least one transceiver is configured to communicate with the first AP via at least the first link.

Clause 30: A first AP, comprising: at least one transceiver; a memory comprising instructions; and one or more processors configured to execute the instructions and cause the first AP to perform a method in accordance with any one of Clauses 9-17, wherein the at least one transceiver is configured to transmit the context information for the MLD to the second AP.

Clause 31: A second AP, comprising: at least one transceiver; a memory comprising instructions; and one or more processors configured to execute the instructions and cause the second AP to perform a method in accordance with any one of Clauses 18-24, wherein the at least one transceiver is configured to receive the context information for the MLD from the first AP.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless station, comprising:

at least one transceiver;

at least one memory comprising processor-executable instructions; and one or more processors configured to execute the processor-executable instructions to cause the wireless station to:

communicate, via the at least one transceiver and a first link, with a first access point (AP) affiliated with a multi-link device (MLD);

receive, via the at least one transceiver, signaling from the first AP instructing the wireless station to enable a second link with a second AP that is non-collocated with the first AP;

enable the second link with the second AP after the signaling from the first AP is received;

communicate, via the at least one transceiver during a handover of the wireless station from the first AP to the second AP, with the first AP via the first link and with the second AP via the second link, wherein:

the handover triggers packet duplication on the first link and second link; and to communicate, during the handover, the one or more processors are configured to cause the wireless station to at least one of:

receive, based on the triggered packet duplication, duplicate first packets via both the first link and the second link; or transmit, based on the triggered packet duplication, duplicate second packets via both the first link and second link; and disable the first link with the first AP after completion of the handover.

2. The wireless station of claim 1, wherein the second link is a member of an associated link set when the second link is enabled.

3. The wireless station of claim 2, wherein the one or more processors are further configured to cause the wireless station to:

add, to the associated link set, a third link associated with a third AP affiliated with the MLD; or remove, from the associated link set, a fourth link associated with a fourth AP affiliated with the MLD.

4. The wireless station of claim 3, wherein the one or more processors are further configured to cause the wireless station to:

receive, via the at least one transceiver, a beacon from the first AP; and identify at least the second AP and third AP based on information in the beacon.

5. The wireless station of claim 1, wherein:

the one or more processors are further configured to cause the wireless station to transmit, via the at least one transceiver, signaling to the first AP to initiate the handover; and to enable the second link, the one or more processors are configured to cause the wireless station to enable the second link after the signaling to initiate the handover is transmitted.

6. The wireless station of claim 1, wherein:

the one or more processors are further configured to cause the wireless station to receive, via the at least one transceiver, signaling from the second AP that instructs the wireless station to disable the first link; and to disable the first link, the one or more processors are configured to cause the wireless station to disable the first link after the signaling that instructs the wireless station to disable the first link is received.

7. A method for wireless communication by a wireless node, comprising:

communicating, via a first link, with a first access point (AP) affiliated with a multi-link device (MLD);

receiving signaling from the first AP that instructs the wireless node to enable a second link with a second AP that is non-collocated with the first AP;

enabling the second link with the second AP after the signaling from the first AP is received;

communicating, during a handover of the wireless node from the first AP to the second AP, with the first AP via the first link and with the second AP via the second link, wherein:

the handover triggers packet duplication on the first link and second link the communicating, during the handover, comprises at least one of:

receiving, based on the triggered packet duplication, duplicate first packets via both the first link and the second link; or transmitting, based on the triggered packet duplication, duplicate second packets via both the first link and second link; and disabling the first link with the first AP after completion of the handover.

8. The method of claim 7, wherein the second link is a member of an associated link set when the second link is enabled.

9. The method of claim 8, further comprising:

adding, to the associated link set, a third link associated with a third AP affiliated with the MLD; or removing, from the associated link set, a fourth link associated with a fourth AP affiliated with the MLD.

10. The method of claim 9, further comprising:

receiving a beacon from the first AP; and identifying at least the second AP and third AP based on information in the beacon.

11. The method of claim 7, further comprising transmitting signaling to the first AP initiating the handover, wherein enabling the second link comprises enabling the second link after transmitting the signaling.

12. The method of claim 7, further comprising receiving signaling from the second AP indicating the wireless node is to disable the first link, wherein disabling the first link comprises disabling the first link after receiving the signaling.

* * * * *